Figure 1:
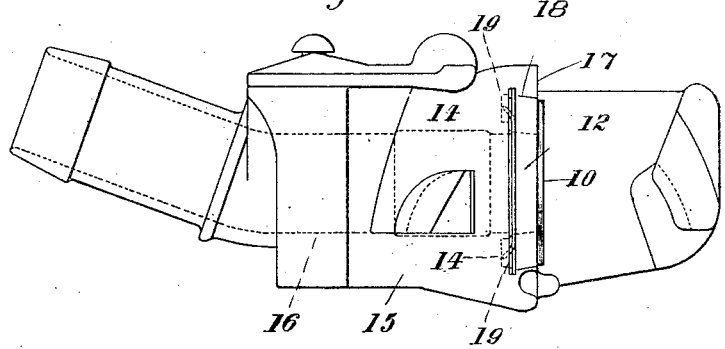

No. 848,549. PATENTED MAR. 26, 1907.
C. S. HAWLEY, F. C. GREEN, W. H. FULTON & J. F. McELROY.
GASKET AND HOLDER THEREFOR.
APPLICATION FILED NOV. 3, 1905.

3 SHEETS—SHEET 1.

Witnesses
L. S. Shaw
M. A. Mosher

Inventors
C. S. Hawley
F. C. Green
W. H. Fulton
J. F. McElroy
by
Bentley Pierson
Attys.

No. 848,549. PATENTED MAR. 26, 1907.
C. S. HAWLEY, F. C. GREEN, W. H. FULTON & J. F. McELROY.
GASKET AND HOLDER THEREFOR.
APPLICATION FILED NOV. 3, 1905.

3 SHEETS—SHEET 2.

Witnesses
L. T. Shaw
M. A. Moder

Inventors.
C. S. Hawley
F. C. Green
W. H. Fulton
J. F. McElroy
by
Bentley & Pierson
Attys.

No. 848,549. PATENTED MAR. 26, 1907.
C. S. HAWLEY, F. C. GREEN, W. H. FULTON & J. F. McELROY.
GASKET AND HOLDER THEREFOR.
APPLICATION FILED NOV. 3, 1905.
3 SHEETS—SHEET 3.
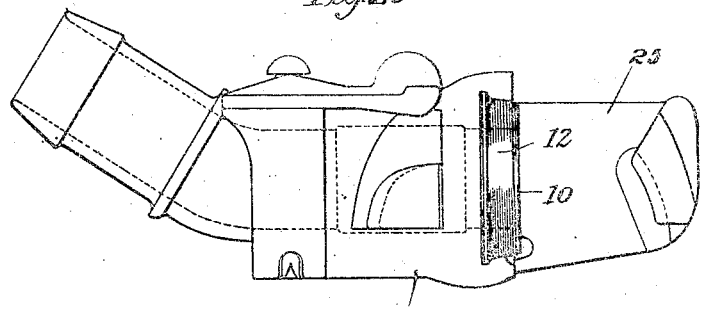
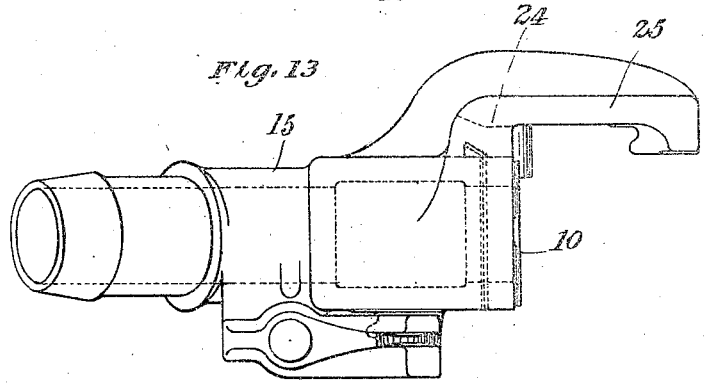
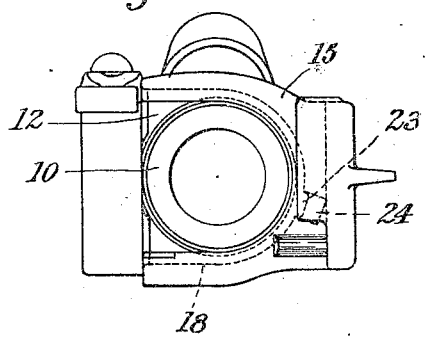
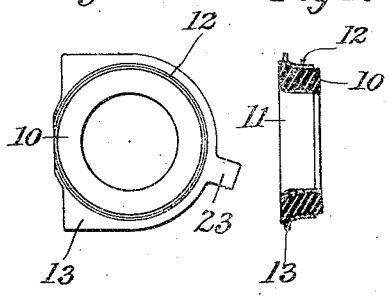
Witnesses
L. T. Shaw
M. A. Moder
Inventors
C. S. Hawley
F. C. Green
W. H. Fulton
J. F. McElroy
by
Bentley & Pierson
Attys.

UNITED STATES PATENT OFFICE.

CORNELL S. HAWLEY AND FRANCIS C. GREEN, OF NEW YORK, AND WILLIAM H. FULTON AND JAMES F. McELROY, OF ALBANY, NEW YORK, ASSIGNORS TO CONSOLIDATED CAR HEATING COMPANY, OF ALBANY, NEW YORK, A CORPORATION OF WEST VIRGINIA.

GASKET AND HOLDER THEREFOR.

No. 848,549.     Specification of Letters Patent.     Patented March 26, 1907.

Application filed November 3, 1905. Serial No. 285,693.

*To all whom it may concern:*

Be it known that we, CORNELL S. HAWLEY, a citizen of the United States, residing at New York city, New York; FRANCIS C. GREEN, a citizen of the United States, residing at New York city, New York; WILLIAM H. FULTON, a citizen of the United States, residing at Albany, county of Albany, State of New York, and JAMES F. McELROY, a citizen of the United States, residing at Albany, county of Albany, State of New York, have invented certain new and useful Improvements in Gaskets and Holders Therefor, of which the following specification and accompanying drawings illustrate one form of the invention, which we now regard as the best out of the various forms in which the invention may be embodied.

This invention relates to the construction of packing-gaskets and their attachment to a coupling member, such as a steam-hose coupler. For convenience we have hereinafter illustrated the Sewall type of straight-port hose-coupler.

The object is to provide a simple and cheap form of packing which may be more readily applied and removed than heretofore and which may be cheaply manufactured in large quantities.

In the drawings we have shown three forms of gasket attachment, each illustrated on a separate sheet.

Figure 2:
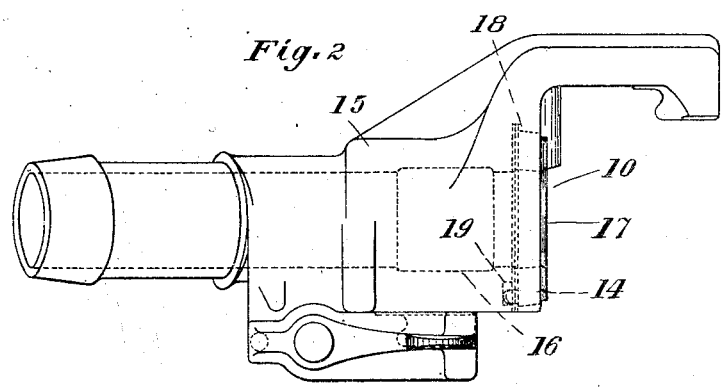
Figure 3:
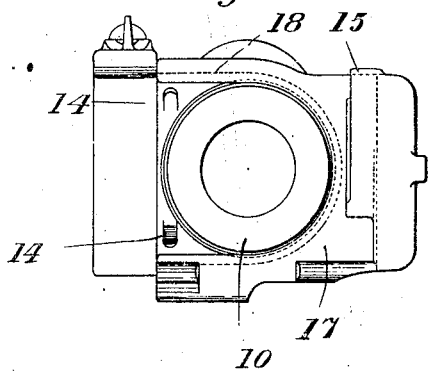
Figure 4:
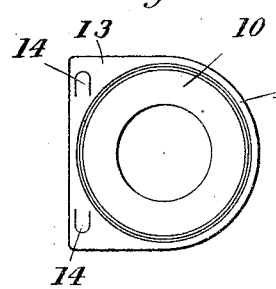
Figure 5:
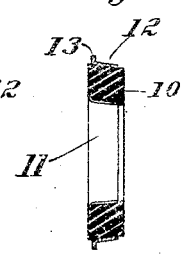
Figure 6:
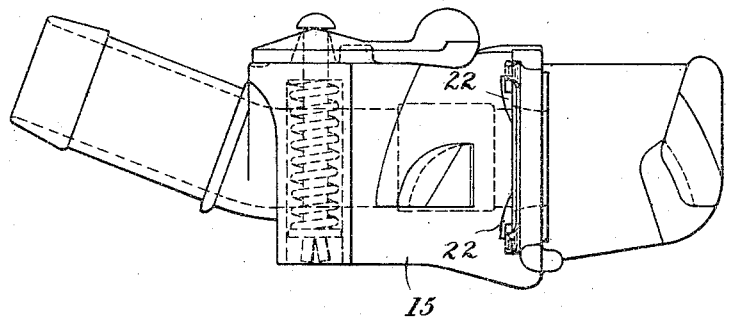
Figure 7:
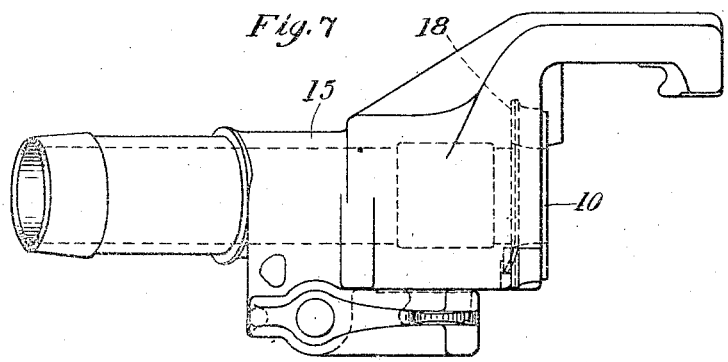
Figure 8:
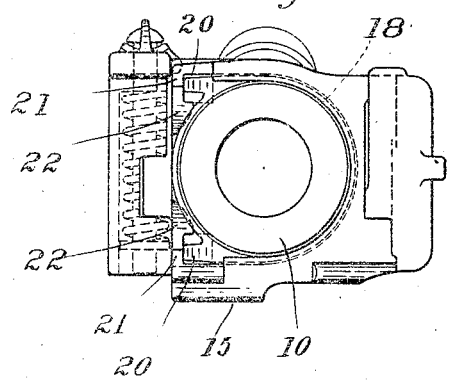
Figure 9:
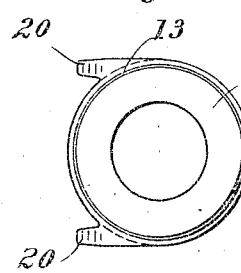
Figure 10:
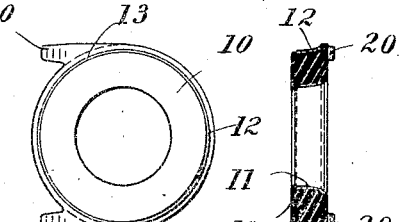
Figure 11:
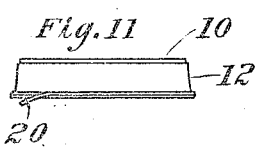

Figure 1 represents a side elevation of a train-pipe-coupler part with a packing-gasket constructed and applied according to our invention. Fig. 2 represents a top plan view. Fig. 3 represents an end view. Fig. 4 represents a detached face view of the gasket. Fig. 5 represents a section of the gasket. Figs. 6 to 10, inclusive, represent views corresponding to the foregoing, showing a different form of the invention; and Fig. 11 represents an edge view of the gasket in this form. Figs. 12 to 16, inclusive, represent views corresponding to Figs. 1 to 5 and showing a third form of the invention.

Referring to Figs. 1 to 5, it will be seen that the gasket itself (represented separately in Figs. 4 and 5) is made in a convenient, cheap, and durable form by incasing an annulus 10, of soft rubber under some compression, between two frusto-conical rings or short tubes 11 12, which may be easily spun or otherwise formed up out of sheet metal, the rubber being allowed to project slightly beyond the rings at the narrower end of the gasket to give a compressible bearing-surface. It should also preferably be at least flush at the wider end, so as to make a tight joint with its seat on the coupler. By reason of the frusto-conical form of the tubes, which are like "nesting" taper-rings, the rubber filling is compressed when the tubes are forced in opposite directions upon it. We do not wholly restrict ourselves to the bearing-face being of rubber, as we may adopt the method of attachment hereinafter described, but vary the form and material of the contacting face. The outer ring 12 has a flange or web 13 in the plane of the gasket, with a substantially D-shaped outline and with two inelastic flexible locking-lugs 14 14 stamped out and adapted to be permanently deflected out of the plane of the flange. 15 is the coupler part of a form covered in copending application of James F. McElroy, Serial No. 198,285, and having the usual axial port 16 terminating at the transverse end face 17. In this face is formed an undercut channel 18 of U form, corresponding to the outline of the flange 13, and into this channel the gasket is adapted to be slipped by an edgewise movement, the lugs 14 being bent into recesses 19 in the floor of the channel to lock the gasket against removal edgewise or diametrically. The undercut channel edges or guides and the flaring of the gasket-frame constitute a tongue-and-groove connection preventing the dislodgment of the gasket in an axial direction, and it is also held against rotation by reason of its form. Any reversal or other equivalent of the undercut guides may of course be substituted without departing from the invention. Thus the gasket may be quickly applied, and when applied it becomes securely lodged against displacement. These reinforced gaskets are also of a better form for handling and are better protected against tearing and abrasion than heretofore. When removed, they come away entire without laceration.

Figs. 6 to 11 show a modification which differs from the foregoing in the form and connections of the locking-lugs. These flexible lugs 20 are included in the terminal edge of the flange 13 and when bent into locking position are lodged behind rigid lugs 21 on the floor of the channel or gasket-seat 18. Adjacent said lugs 21 the floor is cut away at 22 to form recesses and rests, whereby a screw-driver or other thin tool may be inserted beneath the flexible lugs 20 to pry them out from behind the lugs 21. This makes the gasket more readily removable than the form shown in Figs. 1 to 5.

The third form of our invention (shown in Figs. 12 to 16) and which we prefer on some accounts for actual use has a flexible locking-lug 23 on the advance edge of the flange 13, which is bent into a hole 24 traversing the root of the locking-wing 25, formed on the coupler-body. The locking-lug being within the casting is protected from disturbance in regular use. By inserting a narrow instrument, such as a screw-driver, through the rear end of this hole the lug 23 may be bent out and released from its engagement to permit withdrawal of the gasket. In applying the gasket this lug may be bent over into the hole by means of the same instrument.

It will be understood that we have merely illustrated representative forms of the invention and have not attempted to show all the ways in which it may be embodied.

What we claim as new, and desire to secure by Letters Patent, is—

1. In combination, a coupling member and a gasket having a tongue-and-groove sliding connection on opposite edges and engaging by a diametric movement of the gasket.

2. In combination, a member formed with a port and with a gasket-channel transverse to said port and open at one end, and a gasket with opposite edges engaged by the walls of said channel and thereby held against axial displacement.

3. In combination, a coupling member having a port and a gasket-guide transverse thereto, a gasket slidingly engaged with said guide, and means for holding said gasket against diametric sliding movement in said guide.

4. In combination, a coupling member having a port and a gasket-channel open at one side of the port to permit diametric insertion and withdrawal of the gasket, and a gasket mounted in said channel and provided with an adjustable locking device engaging the coupling member for retaining the gasket against withdrawal.

5. A gasket having a flexible inelastic metallic lug adapted to be permanently bent into engagement with a complemental part on a ported coupling member for interlocking the gasket with said member.

6. A gasket comprising a compressible annulus, and a metallic reinforcement therefor formed with an inelastic flexible lug for attaching the gasket to a coupling member.

7. A gasket comprising an annulus of soft material combined with a reinforcing sheet-metal ring having an integral inelastic flexible lug for attaching the annulus to a coupling member.

8. In combination, a coupling member having a port, and a gasket connecting therewith by a sliding movement across said port and composed of compressible material having a metallic reinforcement which engages the coupling member.

9. In combination, a ported coupling member having undercut guides open at one end for transverse insertion and removal of the gasket, and a gasket slidingly mounted in said guides and comprising a compressible annulus and an annular metallic reinforcement formed with a flange fitting the guides.

10. In combination, a ported coupling member having undercut gasket-guides transverse to its port and a gasket slidingly mounted in said guides and composed of a soft annulus and an exterior tapered reinforcing-ring conforming to the undercut guides.

11. A gasket comprising inner and outer frusto-conical rings, and a compressible annulus held between said rings.

12. A gasket comprising inner and outer tapering rings and a compressible annulus held between said rings and projecting beyond the same to form a yielding packing-face.

13. A gasket comprising inner and outer tapering rings and a compressible annulus confined between the same and exposed at both ends to form yielding packing-faces.

14. In combination, a coupling member having a channel, and a gasket slidably mounted in said channel and comprising a compressible portion, and a sheet-metal reinforcement therefor having a flange engaging the edges of the channel, and a flexible lug interlocking with the coupling member to prevent sliding movement of the gasket.

15. In combination, a coupling member having a channel with a substantially U-shaped undercut edge, and a gasket having a sheet-metal portion with a U-shaped edge slidingly engaged with the channel edge, a flexible tongue locking the gasket against sliding movement, and a rubber annulus mounted in said sheet-metal portion.

16. In combination, a ported coupling member formed with a portion for engagement by a gasket-lug, and a gasket on said member having a flexible lug bent into engagement with said portion for holding the gasket in place.

17. In combination, a ported coupling member having a gasket-channel transverse to its port, and a gasket slidingly mounted in said channel and having a flexible lug bent into engagement with the coupling member for holding the gasket against diametric movement.

18. In combination, a ported coupling member having a gasket-channel transverse to its port and a lug-engaging portion adjacent to an open space, and a gasket mounted in said channel and having a flexible metallic lug engaging said portion and presenting a free end in said open space for engagement by a tool.

19. In combination, a coupling member having a port and a gasket-channel open at one side of the port, and a gasket mounted in said channel and having a flexible lug bent into engagement with the coupling member on the opposite side of the port.

20. In combination, a coupler part having a port-face, a locking-wing alongside of said port-face and an aperture formed in the body of the coupler part substantially at the root of said wing and extending through to the outer side thereof, and a removable gasket-holder having an adjustable locking member which hooks over into said aperture.

In witness whereof we have hereunto set our hands, before two subscribing witnesses, the 30th day of October, 1905.

CORNELL S. HAWLEY.
FRANCIS C. GREEN.

Witnesses to Cornell S. Hawley's and Francis C. Green's signatures:
CHARLES H. POOL,
EDWARD KARL.

In witness whereof we have hereunto set our hands, before two subscribing witnesses, the 25th day of October, 1905.

WILLIAM H. FULTON.
JAMES F. McELROY.

Witnesses to William H. Fulton's and James F. McElroy's signatures:
BEULAH CARLE,
ERNEST D. JANSEN.